US012037753B2

(12) United States Patent
Huhn et al.

(10) Patent No.: US 12,037,753 B2
(45) Date of Patent: Jul. 16, 2024

(54) WORK MACHINE STABILITY CONTROL SYSTEM

(71) Applicant: Caterpillar Paving Products Inc., Brooklyn Park, MN (US)

(72) Inventors: Derek K. Huhn, Monticello, MN (US); Nicholas A. Oetken, Brooklyn Park, MN (US); David Edwin Gerding, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 315 days.

(21) Appl. No.: 17/692,718

(22) Filed: Mar. 11, 2022

(65) Prior Publication Data

US 2023/0287636 A1 Sep. 14, 2023

(51) Int. Cl.
*E01C 19/00* (2006.01)
*E01C 19/28* (2006.01)

(52) U.S. Cl.
CPC .................................. *E01C 19/288* (2013.01)

(58) Field of Classification Search
CPC .... E01C 19/288; E01C 19/282; E01C 19/004; B60W 60/0025; B60W 2030/041; B60W 2300/17; B60W 2520/14; B60W 2520/16; B60W 2552/15; B60W 30/04; B60W 2030/043; B60W 2520/18; B60W 2710/30; B60Y 2200/413
See application file for complete search history.

(56) References Cited

U.S. PATENT DOCUMENTS

| | | | |
|---|---|---|---|
| 6,728,607 B1 | 4/2004 | Anderson | |
| 7,228,214 B2 | 6/2007 | Flann et al. | |
| 9,598,843 B2 | 3/2017 | Wei et al. | |
| 9,950,722 B2 | 4/2018 | Kumar et al. | |
| 10,580,296 B2 | 3/2020 | Pedersen et al. | |
| 10,821,992 B2 | 11/2020 | Skillsäter et al. | |
| 11,144,055 B2 | 10/2021 | Oetken et al. | |
| 11,926,427 B2 * | 3/2024 | Morrison | H01M 8/04074 |
| 2020/0117201 A1 | 4/2020 | Oetken et al. | |

* cited by examiner

*Primary Examiner* — Ian Jen (57) ABSTRACT

An autonomous stability control system may include a sensing system configured to collect position and orientation data about a work machine on a construction site and a controller. The controller may be configured to receive or generate a work path plan, operate the work machine according to the work path plan, continually or periodically monitor the orientation data from the sensing system, compare the orientation data to a vibration slope threshold, and, when the orientation data exceeds the vibration slope threshold, deactivate a vibration system of the work machine.

20 Claims, 6 Drawing Sheets

WORK MACHINE STABILITY CONTROL SYSTEM

TECHNICAL FIELD

The present application generally relates to work machines. More particularly, the present disclosure relates to autonomous work machines having a stability control system. Still more particularly, the present application relates to autonomous compaction machines having stability control systems to reduce or prevent rollover and/or sliding.

BACKGROUND

Autonomous worksites can employ a plurality of autonomous machines to perform a variety of tasks that may be controlled by a combination of on-board and off-board computers, processors, and other electronic controllers rather than human operators. As a result, autonomous operation may enhance the productivity of the machines, and reduce the human resources required for controlling the operation of the worksite. Autonomous work machines, however, may lack an onboard operator that can observe the surrounding and underfoot environment and conditions and control the machine in a manner to avoid obstructions or other non-navigable areas such as overly steep slopes, drop offs, waterways and the like. Accordingly, autonomous vehicles may sometimes encounter overly steep grades, unstable ground, or other relatively hazardous conditions or situations.

U.S. Pat. No. 9,598,843 relates to automated earth moving equipment where a controller uses information from real-time sensors and contour maps to determine a new route to a destination to avoid a temporary obstruction, traverse between work slots, or traverse between work areas. U.S. Pat. No. 10,821,992 relates to a method for predicting risk of rollover of a work machine for load transportation.

SUMMARY

In one or more examples, an autonomous stability control system may include a sensing system configured to collect position and orientation data about a work machine on a construction site and a controller. The controller may be configured to receive or generate a work path plan, operate the work machine according to the work path plan, continually or periodically monitor the orientation data from the sensing system, compare the orientation data to a vibration slope threshold, and, when the orientation data exceeds the vibration slope threshold, deactivate a vibration system of the work machine.

In one or more examples, a work machine may include a frame, a motive power component secured to the frame, a traction system operable by the motive power component and comprising a compaction roller, and a vibration system configured to impart vibration to the work machine to aid the compaction roller in compacting a subgrade. The work machine may also include a sensing system configured to collect position and orientation data about the work machine on a construction site and a controller. The controller may be configured to receive or generate a work path plan, operate the work machine according to the work path plan, continually or periodically monitor the orientation data from the sensing system, compare the orientation data to a vibration slope threshold, and, when the orientation data exceeds the vibration slope threshold, deactivate the vibration system of the work machine.

In one or more examples, a method of performing stability control for a work machine may include developing or receiving a work path plan, continually or periodically monitoring slopes encountered by the work machine, and comparing the slopes to a vibration slope threshold. Where a vibration slope threshold is exceeded, the method may include deactivating the vibration system.

DETAILED DESCRIPTION

The present application, in one or more examples, relates to an autonomous compaction machine that monitors slope conditions and limits, interrupts, or stops selected machine operations based on those conditions. In particular, for example, where a compaction machine encounters an overly steep grade, a controller of the machine may limit, interrupt, or stop vibratory operations unless/until the machine is able to travel to, or otherwise arrives at, a less steep grade. The compaction machine may issue an operator or manager alert and may also adjust a travel or work path plan based on the encountered grade. That is, for example, a new work path plan may avoid the identified area or may adjust the work path plan to cause the area to be encountered in a different direction such that the overly steep grade does not extend from side-to-side across the machine, but, instead, extends along the length of the machine. Still other approaches to addressing the identified area may be provided.

Figure 1:
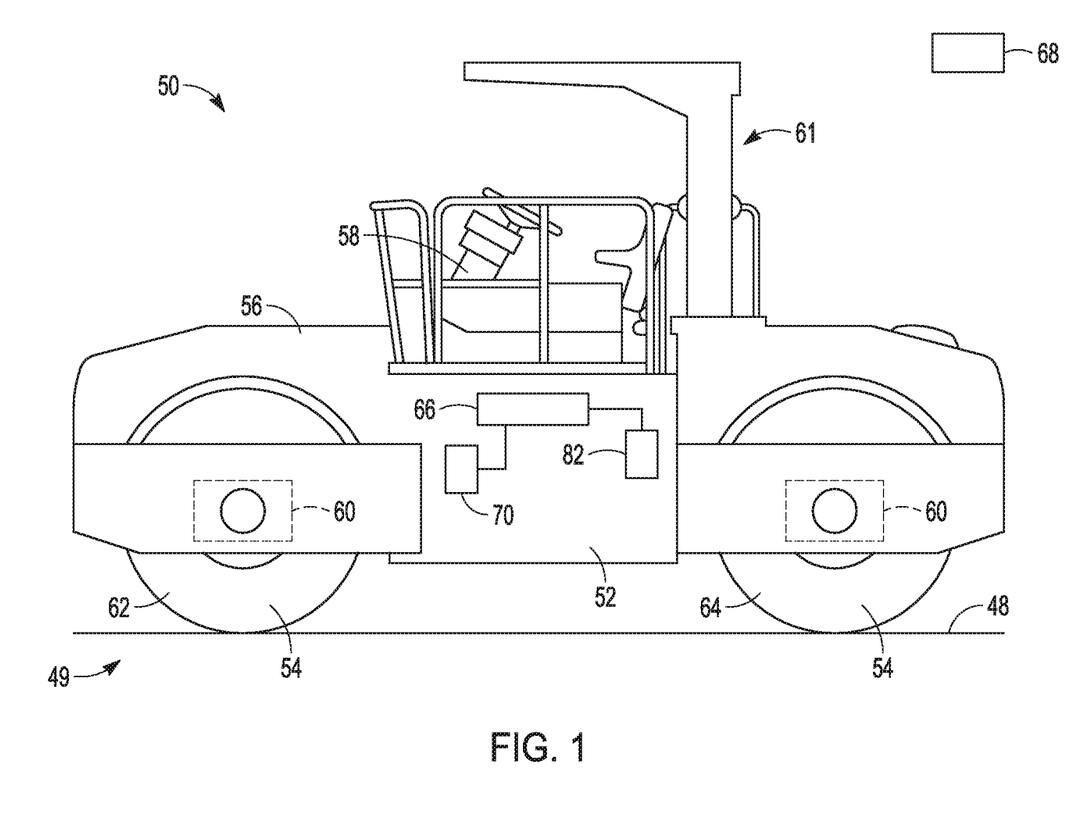
FIG. 1 depicts a work machine, according to one or more examples.

FIG. 1 is a perspective view of a work machine 50, according to one or more examples. FIG. 1 also depicts a system for controlling the autonomous work machine 50, in accordance with at least one example of the present disclosure. Autonomous work machines may include any vehicle type that may be used on a construction site and that could benefit from autonomous control. For example, autonomous work machines may include cold planers, paving machines, graders, compaction machines, tractors, or the like. Compaction machines, for example, may be employed for compacting asphalt, dirt, gravel, and other compactable work materials associated with construction sites such as road surfaces. A wide variety of compaction machines may be selected from depending on the nature of the site and the desired compaction. For example, smooth wheel rollers, sheep's foot, elephant foot, pad foot, or slash presser rollers may be used. In still other situations, pneumatic tire rollers, wobble wheel rollers, impact rollers, or grid rollers may be used. Still other types of compaction machines may be provided and still other machines may be provided.

Many of the listed compaction machines may include a relatively heavy roller adapted to compact the ground or surface over which it operates. In addition, a vibratory component may be provided that, for example, vibrates the roller to assist with the compaction of the supporting surface. As may be appreciated, when the compaction machine is operated on a slope, the ability for the compaction machine to maintain and/or control its position may be based on the friction that develops between the roller surface and the supporting surface. Moreover, it may also be appreciated that vibration of the roller may reduce the gripping ability of the roller. As such, the degree of slope on which a compaction machine may remain stable may be smaller when a vibration system is active. Said another way, deactivation of a vibration system may allow a compaction machine to remain stable on a slope where the machine was otherwise potentially unstable with the vibration system active.

In the illustrated example, the work machine 50 is a compaction machine that can travel over a surface 48 compacting a work material 49 such as, for example, a soil subgrade. The work machine 50 may include a body or frame 52 that inter-operatively connects the various physical, structural, and/or operable features that enable the compaction machine 50 to function. These features may include one or more traction or ground engaging systems 54 such as tracks, wheels, and/or rollers. These features may also include a motive power source 56, such as an internal combustion engine or an electric motor that may be mounted to the frame 52 and can generate power to physically drive the traction system and 54 and move the compaction machine 50. Additional auxiliary systems may draw power from the motive power source as well. For example, the machine may include a steering system 58 including a steering linkage driven by a power source that derives power from the motive power source 56 or other power source and is adapted to direct the traction system 54 to, in turn, direct the work machine 50 in a particular direction. A vibration system 60 may also be provided, which may be separate from or integrated into the traction system 54 to vibrate the machine 50 and/or rollers thereof to assist with compaction of the supporting surface and/or work material below the supporting surface. Depending on the level of autonomy provided by the machine controller(s) discussed below, the work machine may also include a cab 61 for an operator and one or more operation feature such as gas/brake pedals, steering wheel, or other operator control features as well as operator feedback and interface features such as displays and/or speakers for showing/sounding operating parameters, alerts, and the like.

More particularly, to enable motion of the work machine 50 relative to the surface 48, the traction system 54 of the illustrated work machine 50 may include a first roller drum 62 (or compacting element 62) and a second roller drum 64 (or compacting element 64) that are in rolling contact with the surface 50. Both the first roller drum 62 and the second roller drum 64 may be rotatably coupled to the frame 52 so that the first and second roller drums 62, 64 roll over the surface 48 as the work machine 50 travels thereon. To transfer motive power from the power system to the surface 48, the power system can operatively engage and rotate the first roller drum 52, the second roller drum 54, or combinations thereof, through an appropriate power train (not shown).

It will be appreciated that the first roller drum 52 can have the same or different construction as the second roller drum 54. It should further be appreciated that the machine 50 may include a single roller drum and tires (not shown) to contact the surface 48. As mentioned, the work machine may include a vibration system 60, which may be integrated into both the first roller drum 62 and the second roller drum 64. While FIG. 1 shows both the first and second roller drums 62, 64 having a portion of the vibration system 60, in other embodiments the vibration system may be arranged and/or integrated into either the first or the second roller drum 62, 64.

The overall operation of the work machine 50 within a worksite may be managed by a vehicle controller 66 on the work machine 50 or an external controller 68 that is at least partially in communication with the work machine 50. Moreover, each work machine 50 may include any one or more of a variety of feedback devices capable of signaling, tracking, monitoring, or otherwise communicating relevant machine information to the one or more controllers 66/68. For example, the external controller 68 may be located at a base station and each machine 50 may include a locating device 82 configured to communicate with the external controller 68 via any of a variety of technology communication mechanisms to communicate various information pertaining to the position and/or orientation of the machine 50 relative to the construction site. The vehicle controller 66 or the external controller 68 may control the operation of various aspects of the work machine 50 including, for example, the drivetrain, steering system, hydraulic systems or other aspects of the machine.

The vehicle controller 66 may be an electronic controller that performs operations, executes control algorithms, stores and retrieves data and other desired operations. The vehicle controller 66 may include, or access, memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the vehicle controller 150 such as power supply circuitry, signal conditioning circuitry, driver circuitry, and other types of circuitry.

The vehicle controller 66 may be a single controller or may include more than one controller disposed to control various functions and/or features of the work machine 50. The term "controller" is meant to be used in its broadest sense to include one or more controllers and/or microprocessors that may cooperate in controlling various functions and operations of the work machine 50. The term "controller" does not include a human. The functionality of the controller 66 may be implemented in hardware and/or software without regard to the functionality. The controller 66 may rely on one or more data maps relating to the operating conditions and the operating environment of the machine 50 and a construction site that may be stored in memory. Each of these data maps may include a collection of data in the form of tables, graphs, digital images and/or equations.

External controller 68 may include or access memory, secondary storage devices, processors, and any other components for running an application. Control of the work machine 50 may be implemented in any number of different arrangements. For example, control may be at least partially implemented at external controller 68 situated locally and/or remotely relative to the construction site with sufficient means for communicating with the work machine 50, via any of a variety of wireless communication systems, for example via a satellite, or the like. Using any of the foregoing arrangements, external controller 68 may generally be configured to monitor the position of the work machine 50 relative to the construction site and a predetermined target compaction operation and provide instructions for controlling the work machine 50 in an efficient manner to compact surface 48. In at least one example, the external controller 68 may wirelessly communicate a construction site plan to the vehicle controller 66.

Work machine 50 may be configured to be operated autonomously, semi-autonomously, or manually. When operating semi-autonomously or manually, the work machine 50 may be operated by remote control and/or by an operator physically located within the cab 61.

The vehicle controller 66 may include a sensing system 70. The sensing system 70 may include a plurality of machine sensors that provide data indicative (directly or indirectly) of various operating parameters or conditions of the machine and/or the operating environment in which the machine is operating. That is, the term "sensor" is meant to be used in its broadest sense to include one or more sensors and related components that may be associated with the work machine 50 and that may cooperate to sense various functions, operations, conditions, and/or operating characteristics of the machine and/or aspects of the environment in which the machine is operating.

More particularly, the sensors may be configured to sense the position and orientation (i.e., the heading, pitch, roll or tilt, and yaw) of the machine relative to the construction site. The sensing system 70 may include a plurality of individual sensors that cooperate to generate and provide position signals to the vehicle controller 66 indicative of the position and orientation of the work machine 50. With respect to position, in one or more examples, the sensing system 70 may include one or more sensors that interact with a positioning system such as a global navigation satellite system or a global positioning system to operate as a position sensor. Additionally or alternatively, the sensing system 70 may include a perception-based system, or may use other systems such as lasers, sonar, or radar to determine all or some aspects of the position of the work machine 50. For purposes of orientation, the sensing system 70 may further include a slope or inclination sensor such as one or more pitch or roll angle sensors for measuring the pitch and/or roll of the work machine 50 relative to a reference. The reference may be a ground or horizon reference or an earth reference such as, for example, the direction of earth's gravity may be used. The sensing system 70 may also be used to determine a ground speed of the work machine 50. Other sensors or a dedicated ground speed sensor may also be used to determine the ground speed of the work machine 50. Sensors may also be provided to monitor the operating conditions of the machine engine and drivetrain such as an engine speed sensor. Other sensors necessary or desirable for operating the work machine 50 may be provided.

While the work machine 50 is illustrated as a compactor machine, one of ordinary skill in the art would understand that the systems and methods of the present application extend to other work machines. Moreover, for the purposes of this disclosure, "autonomous" means both "autonomous" and "semi-autonomous." That is, machines having no cab or other on-machine operation stations for a human operator as well as machines with such operation stations may be provided. In any case, autonomous work machines may include fully autonomous work machines or semi-autonomous machines where, for example, the work machine has the capacity to be controlled according to a predetermined and/or periodically updated path plan designating the path that the work machine is to take within a worksite boundary. In at least one example, "about" and "approximately" may mean within 10% of a stated value. In at least one example, "about" and "approximately" may mean within 1% of a stated value.

Figure 2:
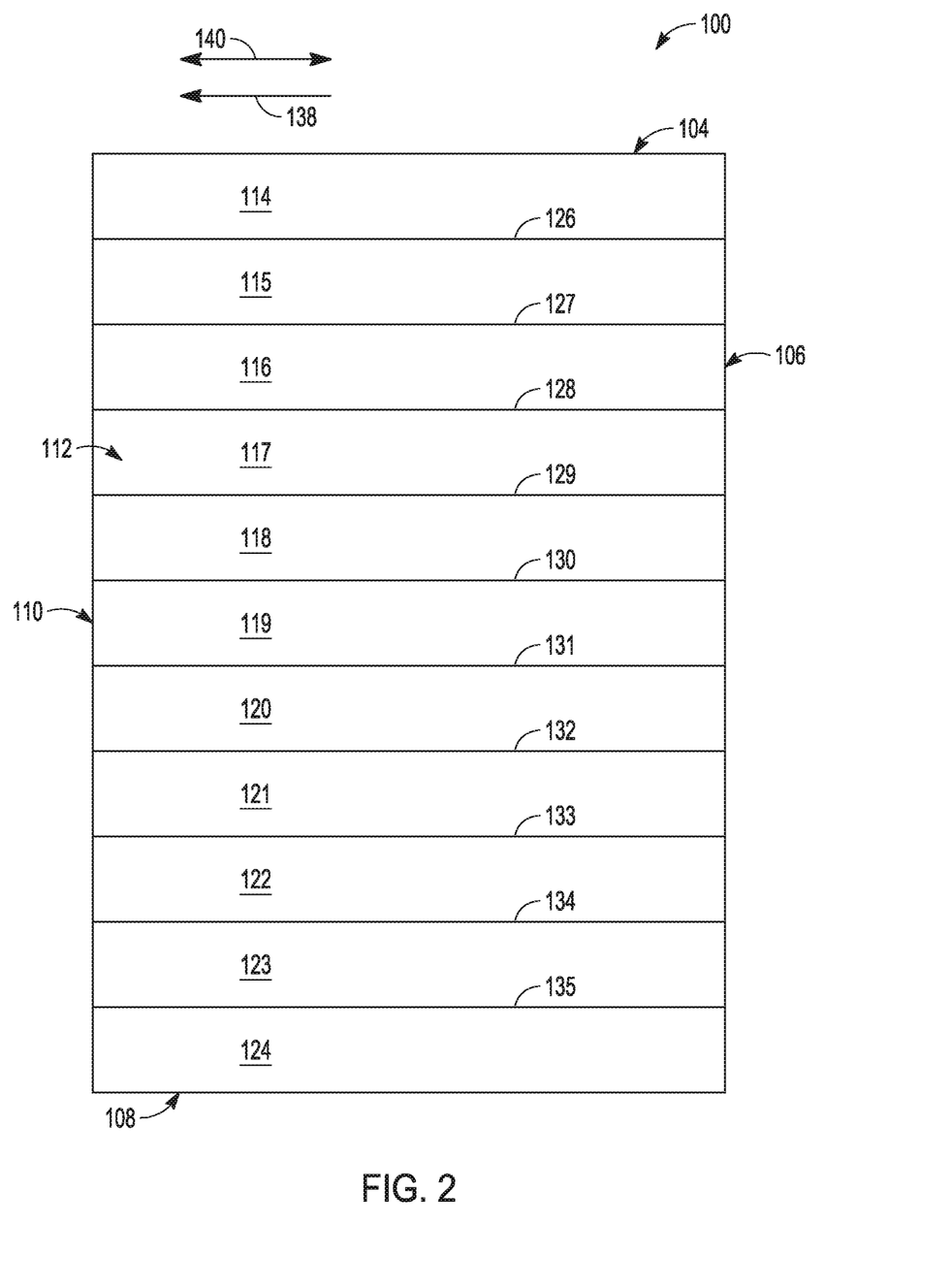
FIG. 2 is a plan view of a construction site plan for an autonomous work machine, according to one or more examples.

FIG. 2 is a plan view of a construction site plan 100 for an autonomous work machine, in accordance with at least one example. In particular, the construction site plan 100 may be created based on boundary information and without access to topographical information. The construction site plan 100 may include a boundary 102 defining the worksite. In the illustrated example, the worksite boundary 102 is a rectangle comprising four edges 104, 106, 108, 110. However, in other examples, the worksite boundary 102 may define any of a variety of shapes with any of a number of edges included curved or straight edges. The construction site plan 100 may be overlaid with a path plan 112. For example, a computing system including one or more of the controllers 116/118 may identify or be provided with a construction site plan and may develop or generate a path plan to compact, treat, or otherwise address one or more areas of the construction site plan.

In one or more examples, and, as mentioned, the computing system generating the path plan may not have access to ground slope or topography information and may generate the path plan based on path efficiency principles resulting in a path plan similar to that shown in FIG. 2, for example. As shown in FIG. 2, a path plan based on path efficiency principles may include a number of paths 114, 115, 116, 117, 118, 119, 120, 121, 122, 123, 124 defined by a number of path lines 126, 127, 128, 129, 130, 131, 132, 133, 134, 135 and the edges 104, 106, 108, 110 of the worksite boundary 102. Each path 114-124 indicates a path for an autonomous work machine.

As may be appreciated, however, the ground surface within the construction site plan may not be flat and may, instead, include slopes that may affect the stability of the work machine. That is, and assuming that there is a goal of maintaining a stable machine (i.e., not roll or tilting side-to-side, not tipping end-to-end, not sliding, and avoiding combinations thereof), the machine may have a series of slope grades that may be suitable for stable operation and grades that are less suitable or not suitable for stable operation. This series of slopes may be defined by thresholds. For example, there may be a limit to how steep of a grade the machine may be able to climb or ascend and a same or different limit on how steep of a grade the machine may descend. There may also be a limit to how steep of a grade the machine may be able to operate across (i.e., where the grade extends from side-to-side across the machine.). Still further, combinations of climbing/ascending and operating across or descending and operating across may affect the threshold grade the machine may operate on and remain stable. Still further, each of these threshold grades may be impacted by whether the vibration system is operating or not operating. That is, and in all cases (climbing/ascending, descending, operating across, or combinations thereof), the threshold grade may be slightly, or significantly, lower if the vibration system is operating as compared to when the vibration system is idle or off.

Figure 3:
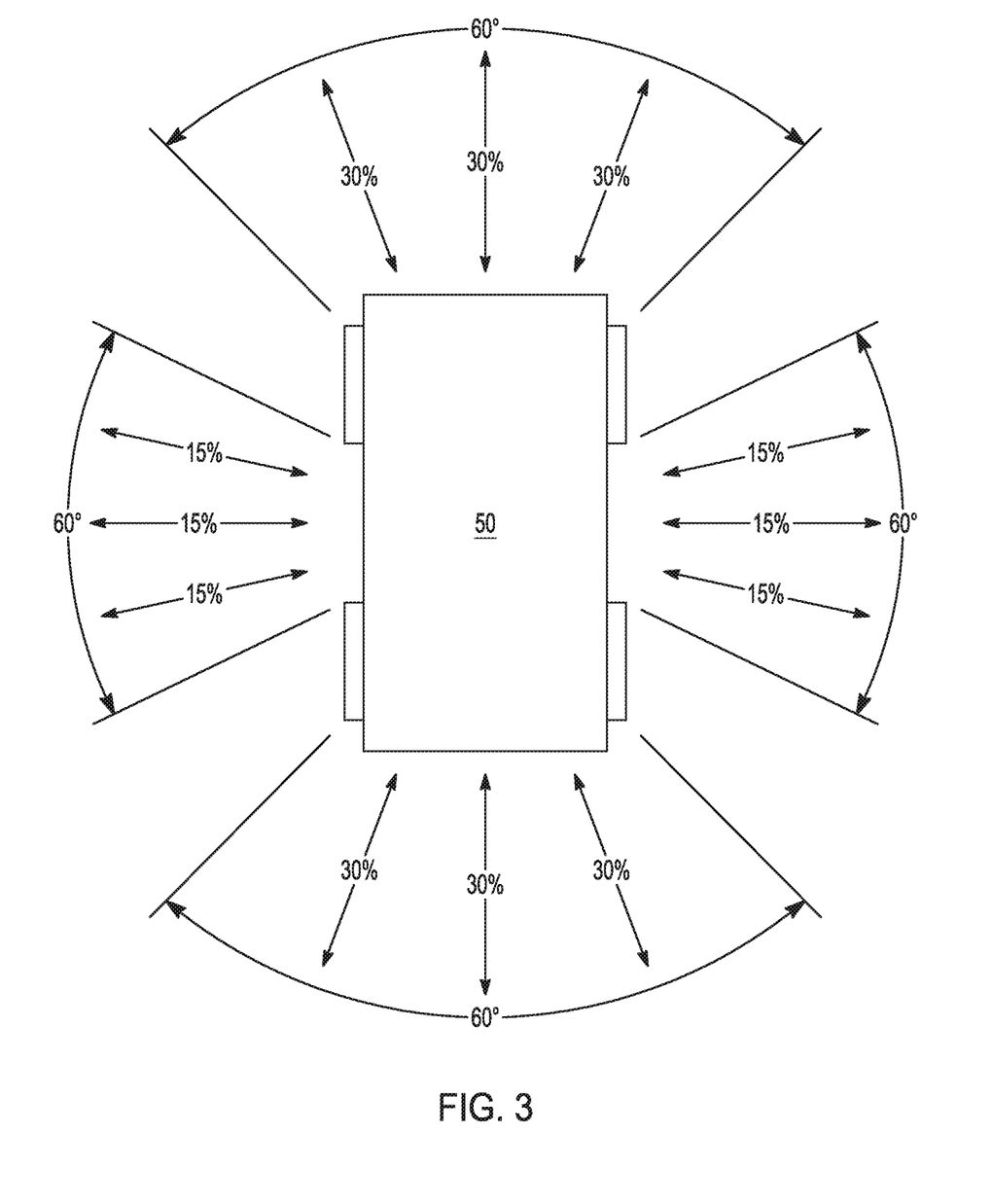
FIG. 3 is a top-down view of a work machine depicting an array of vibration slope thresholds, according to one or more examples.
Figure 4:
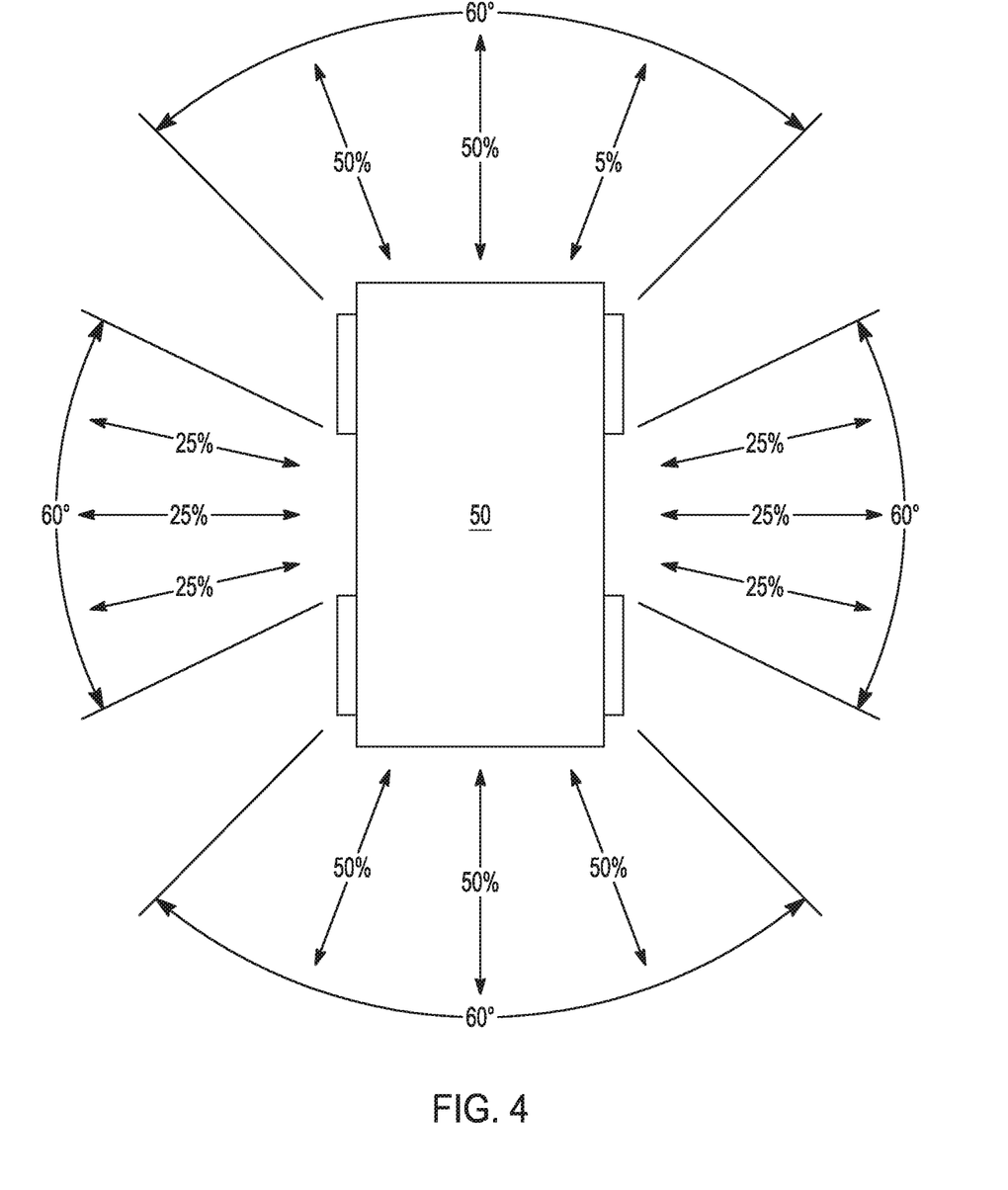
FIG. 4 is a top-down view of a work machine depicting an array of non-vibration slope thresholds, according to one or more examples.

In view of this, the one or more of the controllers 66/68 may be configured to monitor the slope on which the work machine is operating. Moreover, one or more of the controllers 66/68 may be configured to control the vibration system 60 based on the slope on which the work machine is operating. That is, and in particular, one or more of the controllers 66/68 may be adapted to deactivate the vibration system 60 when vibration slope thresholds are met or exceeded. FIG. 3 shows an array of slopes relative to the orientation of the work machine and these thresholds may function as vibration slope thresholds when, for example, the vibration system is active. As shown, when the slope is oriented generally along the length of the machine and varying 30 degrees to either side of the machine, the vibrations slope threshold may be about 10% to 75%, or about 15% to 50%, or about 30%. However, when the slope is oriented generally across the width of the machine and varying 30 degrees toward the front or rear of the machine, the vibration slope threshold may be about 2% to 60%, or about 10% to 30%, or about 10%. When the slope is oriented between these ranges, the threshold may be the lower of the two thresholds or an interpolated value may be used. In contrast, FIG. 4 shows a comparable array of slopes relative to the orientation of the work machine that may function as operating thresholds when, for example, the vibration system is inactive. As shown, when the slope is oriented generally along the length of the machine and varying 30 degrees to either side of the machine, the vibrations slope threshold may be about 15% to about 80%, or about 20% to 60% or about 50%. However, when the slope is oriented generally across the width of the machine and varying 30 degrees toward the front or rear of the machine, the vibration slope threshold may be about 10%-60%, or about 15%-30%, or about 25%. When the slope is oriented between these ranges, the threshold may be the lower of the two thresholds or an interpolated value may be used.

It is to be appreciated that while the slope ranges have been expressed in percentages, the slopes may also be expressed in degrees. Moreover, while the thresholds have been said to apply when the plan view orientation of the slope falls within a range that varies 30 degrees each side of directly across and directly longitudinally along (e.g., FIGS. 3 and 4), an approach without these ranges may also be used. In these cases, linear interpolation may be used to establish a threshold when there is any variance from a slope orientation that extends directly across or directly longitudinally along the machine. For example, and using degrees instead of percentages, if a side slope threshold is 10 degrees and a front-to-back slope threshold is 30 degrees, any slope orientation between these aligned orientations may be calculated using linear interpolation. That is, if the orientation of the slope relative to the machine extends approximately at a 45 degree angle relative to the longitudinal direction of the machine, the threshold may be 20 degrees because the slope is half way between a side slope and a front-to-back slope. Other values between 10 and 30 degrees may be calculated based on this linear relationship. Moreover, the 10 and 30 degree thresholds for side slope and front-to-back slope, respectively, have been used as an example and may be adjusted based on the type of machine or for other reasons.

The controller 66/68 may monitor system operation and when a threshold is exceeded, the controller 66/68 may perform one or more additional tasks. For example, if the vibration system 60 is active and a vibration slope threshold is exceeded, the controller 66/68 may deactivate the vibration system 60. In one more examples, the controller 66/68 may also issue an alert to the operator that is on or off of the work machine or to a manager of an autonomous fleet, for example. The alert may allow the operator or manager to appreciate that a vibration slope threshold has been met or exceeded, for example. With the vibration system off, the controller 66/68 may continue to monitor the slope of the work machine 50 with a goal of reactivating the vibration system 60 when the slope falls back down below the threshold or the orientation of the work machine 50 relative to the slope changes in a manner allowing the threshold to increase. To this end, the controller 66/68 may control the path of the autonomous machine 50 by, for example, steering downhill or uphill in an effort to increase the threshold or steering toward areas adjacent to previously traveled areas that are known to have less steep grades. Moreover, the controller 66/68 may identify one or more locations along the pathway as it moves throughout the pathway as having slopes that exceed one or more thresholds. The controller may then function to remap or replan the work machine path to accommodate the sensed slope.

This remapping may be similar to path planning methods performed when topography information is available from the beginning. For example, when topography information and slope threshold information is available from the beginning, a computing system may generate a path plan based on a combination of path efficiency principles supplemented with machine stability thresholds, which may result in a path plan similar to that of FIG. 2 or 5. That is, while FIG. 2 was described as a plan developed without access to topographical information, FIG. 2 could result even given access to topography information. That is, for example, the path plan 112 of FIG. 2 may result due to a goal of aligning the path lines 126-135 and the paths 114-124 with the slope. In the illustrated example, the slope may extend downward between edge 110 and edge 106 of the worksite boundary 102. For the purposes of description, edge 110 may be designated as elevated relative to edge 106 and an upward slope direction 138 is shown. As such, the path plan 112 indicates a movement direction 140 such that the autonomous work machine is to move up toward edge 10 and down toward edge 106 along the paths 114-124. For example, if the autonomous work machine were to start at edge 106 of path 124, the autonomous work machine would travel up the slope along path 124 toward edge 110, down the slope along path 123 toward edge 106, up the slope along path 122 toward edge 110, and so on until the autonomous work machine has completed the construction site plan.

Referring back to the remapping or replanning, a work machine with a path plan not based on topographical information may encounter slopes and may remap or replan the path. In some cases, the remapped or replanned path may reflect a path developed based on topographical information available when originally developing the path plan. For example, a path plan for construction site plan 100 of FIG. 2 without topographical information may just as well have been developed where paths extend up and down the page rather than across. Were this the case, a work machine may enter the boundary 102 and happen upon a slope that exceeds a threshold. Since the work machine would have begun traversing the work area of FIG. 2 by moving in a direction perpendicular to the slope direction (e.g., up and down on the page), the work machine may deactivate the vibration system until the work machine aligns itself with the slope by turning up or down the slope. The controller 66/68 or other computing system may also perform a remapping or replanning of the path to accommodate the newly identified slope. For example, after aligning itself with the slope, the work machine may reactivate the vibration system 60 and replan the path to continue in back-and-forth fashion up and down the identified slope (e.g., back and forth across the page) unless/until another differing slope is encountered or identified. As a result, even without topographical information from the beginning, the remapped or replanned path may reflect a route that may be developed were topographical information available from the beginning.

Figure 5:
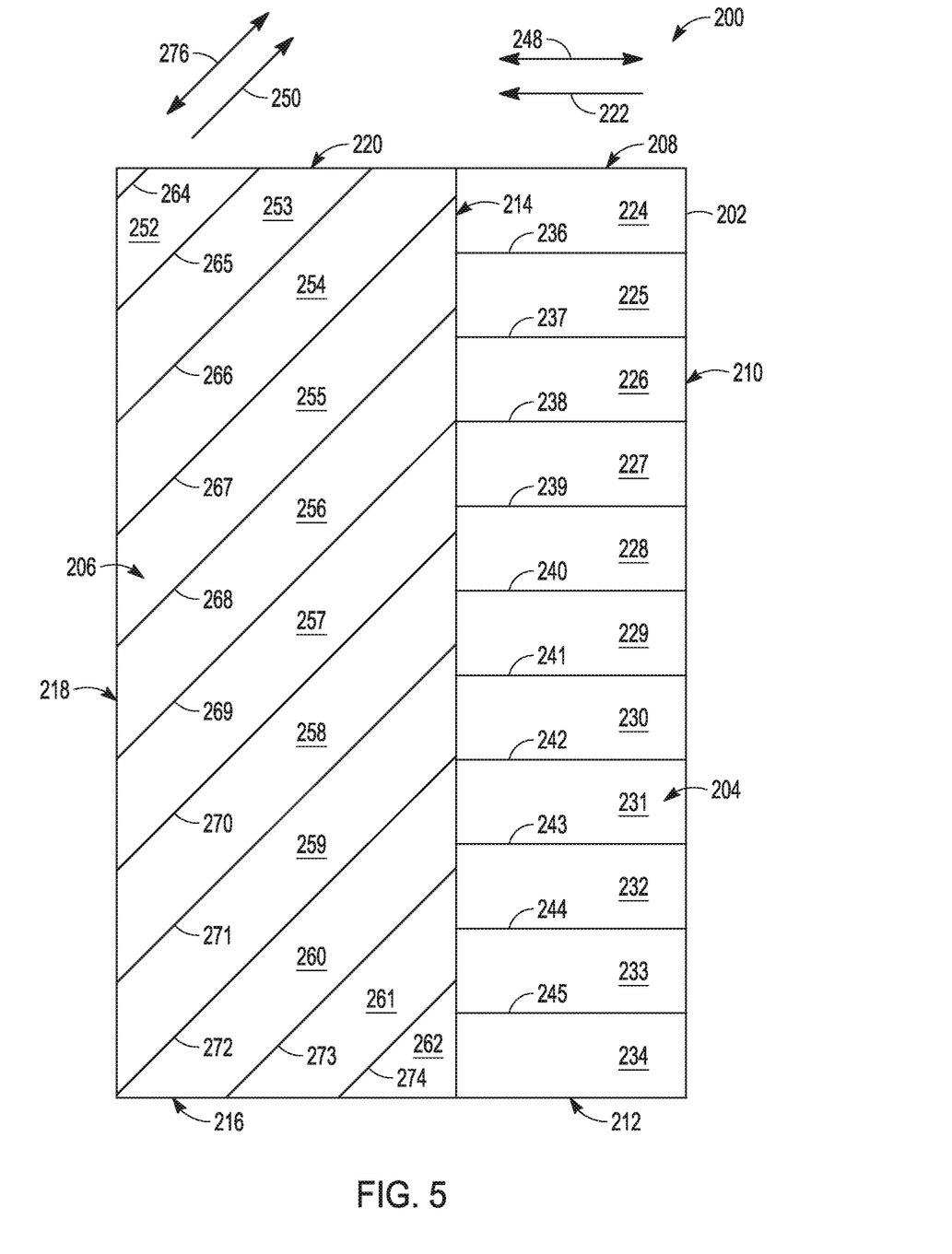
FIG. 5 is a plan view of a construction site plan for an autonomous work machine, in accordance with at least one example.

FIG. 5 is an example of a construction site plan with an inconsistent slope across the site plan. That is, the construction site plan 200 includes a boundary 202 defining a worksite. The site includes two slopes exceeding the threshold value and, as a result, the construction site plan 200 may be divided into two sections, each section including a separate path plan 204, 206. The first section is defined by section boundary lines 208, 210, 212, and 214 and the second section is defined by section boundary lines 216, 218, 220, and 214.

In the first path section, boundary line 214 is elevated relative to boundary line 210, such that the first slope exceeds the threshold value in slope direction 222. If such topographic information were available prior to working on this site, the path plan 204 may be mapped such that the first paths 224, 225, 226, 227, 228, 229, 230, 231, 232, 233, 234 (defined by first path lines 236, 237, 238, 239, 240, 241, 242, 243, 244, 245) align with the first slope direction 222, and the autonomous work machine may be mapped to move in a first movement direction 248. For example, if the autonomous work machine starts at boundary line 210 of path 224, it will move up the slope along path 224 toward boundary line 214, down the slope along path 225 toward boundary line 210, up the slope along path 226 toward boundary line 214, and so on.

In the second path section, boundary line 214 is elevated relative to boundary line 218, and boundary line 220 is elevated relative to boundary line 216, such that the second slope exceeds the threshold value in a second slope direction 250. Again, if such topographic information were available prior to beginning work, a path 206 may be developed such that the second paths 252, 253, 254, 255, 256, 257, 258, 259, 260, 261, 262 (defined by second path lines 264, 265, 266, 267, 268, 269, 270, 271, 272, 273, 274) align with the second slope direction 250, and the autonomous work machine moves in a second movement direction 276. For example, if the autonomous construction is at boundary line 220 heading down the second slope along path 253 toward boundary line 218, it will then head up the second slope along the path 254 in second slope direction 250 toward boundary lines 220, 214, then down the second slope along path 255 toward boundary line 218.

In performing the work, the work machine may complete one of the first and second path plans 204, 206 before starting the other path plan 204, 206. In some examples, the construction site plan 200 may indicate the starting point for each path plan 204, 206. Further, the construction site plan 200 may indicate a transition between the first and second path plans 204, 206. For example, if the first path plan 204 is to be completed first, the construction site plan 200 may determine the starting point of the second path plan 206 based on an end point of the first path plan 204, based on a desired end point of the second path plan 206, based on terrain to be traversed between the first and second path plans 204, 206, based on one or more obstacles, based on terrain outside of the worksite boundary 202, a combination of these, or the like.

In at least one example, at least a portion of the first paths 224-234 and the second paths 252-262 line up, and the autonomous work machine is made to move, for example, along a first path in the first movement direction 248 toward a common boundary line 214 between the first and second path plans 204, 206 and then continue to move along a second path in the second movement direction 276 away from the common boundary line 214, then along another second path in the second movement direction 276 toward the common boundary line 214 and along another first path away from the common boundary line 214, and so on.

Were topographic information not available upon working on the work site 200, a path plan based solely on efficiency may be provided initially. For example, a path plan that minimizes turning and provides a back-and-forth map may be established where the work machine plans to move up and down on the work site area. However, as the work machine enters the construction site plan 200, a diagonally extending downward slope from the right front to the right rear may be identified by the sensor system 120 and the slope may exceed a threshold. The system may deactivate the vibration system and send an alert to an operator or manager, for example. In this case, since turning to align with the slope can be done more quickly by turning up the slope rather than down the slope, the work machine may turn up the slope until it is aligned with the slope, which may cause the vibration slope threshold to no longer be exceeded. The machine may reactivate the vibration system and may continue diagonally and upward along the slope until reaching boundary line 214. Without topographical information, the work machine may continue into the adjacent area with a different slope. However, due to the changing slope and one that may extend partially across the work machine from side-to-side, a vibration slope threshold may be exceeded and the controller may deactivate the vibration system and issue an alert. Again, since aligning with the slope direction is simplest by turning down the slope, the work machine may turn down the slope toward boundary edge 210 until the machine is aligned with the slope. This may increase the vibration slope threshold and the system may reactivate the vibration system. The work machine may continue along this path until reaching the boundary edge 210 where the machine may return with a plan to follow alongside the path just travelled (e.g., right to left across the first slope and diagonally downward and to the left across the second slope). The machine may repeat this bi-directional path until it completes the area and/or until other slopes inconsistent with the identified slopes are encountered and accounted for.

While in the illustrated examples, the movement of the autonomous work machine is aligned with the slope, in other examples, the path plan can indicate a movement direction of the autonomous work machine such that the slope that exceeds the threshold value is not a full side slope relative to movement of the autonomous work machine. In at least one example, a construction site plan may include more than one slope (each slope having a different slope direction) that exceeds the threshold value if the machine were oriented fully sideways on the slope, and the path plan could include paths that run at an angle to both slopes, such that neither slope is a full side slope relative to the movement of the autonomous work machine. As such, the side slope may remain below the threshold value. This concept can be utilized as a work machine encounters several slopes that exceed the vibration slope threshold.

INDUSTRIAL APPLICABILITY

Figure 6:
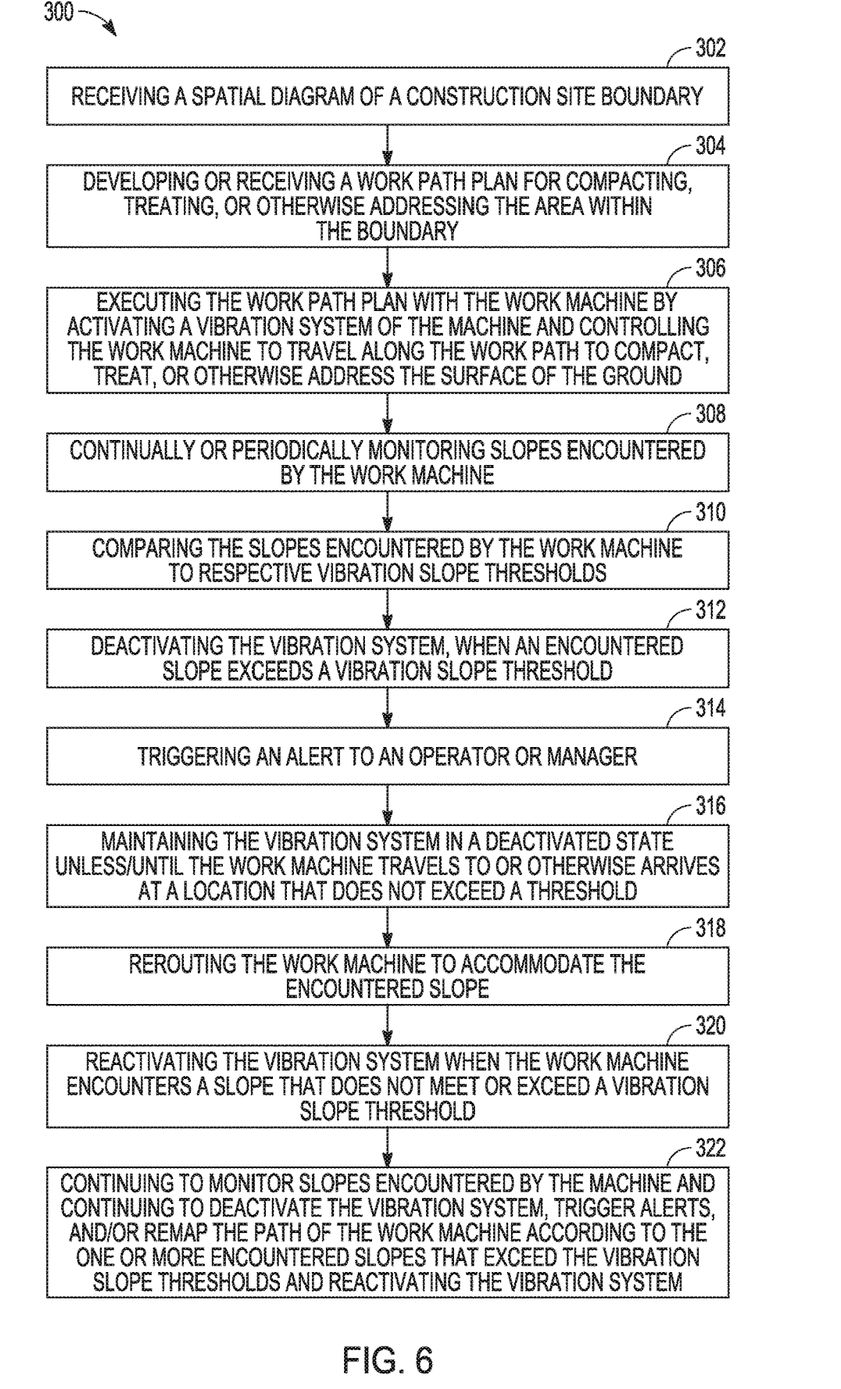
FIG. 6 is diagram depicting a method of performing stability control for a work machine, according to one or more examples.

In operation and use, a method 300 of performing stability control of a work machine may be provided as shown in FIG. 6. The method may be performed by one or more computing systems and/or a controller of the work machine. As shown, the method may include receiving a spatial diagram of a construction site boundary 302 and developing or receiving a work path plan for compacting, treating, or otherwise addressing the area within the boundary 304. The work path plan may be based on path efficiencies such as preferences for back-and-forth routing, minimizing the number of turns, etc. The method may also include executing the work path plan with the work machine by activating a vibration system of the machine and controlling the work machine to travel along the work path to compact, treat, or otherwise address the surface of the ground 306. The method may include continually or periodically monitoring slopes encountered by the work machine 308. The slopes may be compared to a series of thresholds that may include vibration slope thresholds. The vibration slope thresholds may vary based on vehicle orientation relative to the slope and the vibration slope threshold may be selected to maintain the stability of the work machine with respect to tilting side to side, tilting front to back, and/or sliding. The method may also include comparing the slopes encountered by the work machine to respective vibration slope thresholds 310. Where a vibration slope threshold is exceeded, the method may include deactivating the vibration system 312. The method may also include triggering an alert to an operator or manager 314. The method may also include maintaining the vibration system in a deactivated state unless/until the work machine travels to or otherwise arrives at a location that does not exceed a threshold 316. To this end, the method may include rerouting the work machine to accommodate the encountered slope 318. In one or more examples, the rerouting may include turning the work machine up a slope or down a slope to align the travel path with the slope. Alternatively or additionally, rerouting may include traveling to area adjacent to previously traveled areas known to have slopes that do not exceed vibration slope thresholds. In one or more examples, rerouting may include adjusting the path plan according to the encountered area by adjusting the direction of travel of the work machine relative to the encountered area and/or adjacent areas. The method may also include reactivating the vibration system when the work machine encounters a slope that does not meet or exceed a vibration slope threshold 320. The method may also include continuing to monitor slopes encountered by the machine and continuing to deactivate the vibration system, trigger alerts, and/or remap the path of the work machine according to the one or more encountered slopes that exceed the vibration slope thresholds 322.

The above detailed description is intended to be illustrative, and not restrictive. The scope of the disclosure should, therefore, be determined with references to the appended claims, along with the full scope of equivalents to which such claims are entitled.

What is claimed is:

1. An autonomous stability control system, comprising:
    a sensing system configured to collect position and orientation data about a work machine on a construction site; and
    a controller configured to:
        receive or generate a work path plan;
        operate the work machine according to the work path plan;
        continually or periodically monitor the orientation data from the sensing system;
        compare the orientation data to a vibration slope threshold; and
        when the orientation data exceeds the vibration slope threshold, deactivate a vibration system of the work machine.

2. The system of claim 1, wherein the orientation data comprises pitch, roll, or a combination of pitch and roll.

3. The system of claim 1, wherein the controller is further configured to trigger an alert to an operator or manager.

4. The system of claim 1, wherein the controller is further configured to continue operating the work machine and reactivate the vibration system when the work machine arrives at a position where the orientation data no longer exceeds the vibration slope threshold.

5. The system of claim 4, wherein configured to continue operating the machine comprises maintaining a directional course.

6. The system of claim 4, wherein configured to continue operating the machine comprises turning the machine up or down an encountered slope.

7. The system of claim 4, wherein configured to continue operating the machine comprises replanning the work plan path based on a position where the orientation data exceeds the vibration slope threshold.

8. The system of claim 7, wherein replanning the work plan path based on a position where the orientation data exceeds the vibration slope threshold comprises replanning the work plant path based on multiple positions where the orientation data exceeds the vibration slope threshold.

9. A work machine, comprising:
    a frame;
    a motive power component secured to the frame;
    a traction system operable by the motive power component and comprising a compaction roller;
    a vibration system configured to impart vibration to the work machine to aid the compaction roller in compacting a subgrade;
    a sensing system configured to collect position and orientation data about the work machine on a construction site; and
    a controller configured to:
        receive or generate a work path plan;
        operate the work machine according to the work path plan;
        continually or periodically monitor the orientation data from the sensing system;
        compare the orientation data to a vibration slope threshold; and
        when the orientation data exceeds the vibration slope threshold, deactivate the vibration system of the work machine.

10. The work machine of claim 9, wherein the orientation data comprises pitch, roll, or a combination of pitch and roll.

11. The work machine of claim 9, wherein the controller is further configured to trigger an alert to an operator or manager.

12. The work machine of claim 9, wherein the controller is further configured to continue operating the work machine and reactivate the vibration system when the work machine arrives at a position where the orientation data no longer exceeds the vibration slope threshold.

13. The system of claim 12, wherein configured to continue operating the machine comprises maintaining a directional course.

14. The system of claim 12, wherein configured to continue operating the machine comprises turning the machine up or down an encountered slope.

15. The system of claim 12, wherein configured to continue operating the machine comprises replanning the work plan path based on a position where the orientation data exceeds the vibration slope threshold.

16. The system of claim 15, wherein replanning the work plan path based on a position where the orientation data exceeds the vibration slope threshold comprises replanning the work plant path based on multiple positions where the orientation data exceeds the vibration slope threshold.

17. A method of performing stability control for a work machine, comprising:
- developing or receiving a work path plan;
- continually or periodically monitoring slopes encountered by the work machine;
- comparing the slopes to a vibration slope threshold;
- where a vibration slope threshold is exceeded, deactivating the vibration system.

18. The method of claim 17, further comprising alerting an operator or manager.

19. The method of claim 17, further comprising maintaining the vibration system in a deactivated state unless/until the work machine travels to or otherwise arrives at a location with a slope that does not exceed the vibration slope threshold.

20. The method of claim 17, wherein a slope exceeding the vibration slope threshold is an encountered slope and the method further comprising remapping the work pan path to accommodate the encountered slope.

* * * * *